United States Patent Office 2,867,599
Patented Jan. 6, 1959

2,867,599

VULCANIZABLE VINYL-CONTAINING ORGANO-POLYSILOXANES AND PROCESS OF PREPARING ELASTOMERS THEREFROM

Dallas T. Hurd, Burnt Hills, and Robert C. Osthoff, Schenectady, N. Y., assignors to General Electric Company, a corporation of New York No Drawing. Application August 16, 1954
Serial No. 450,229

6 Claims. (Cl. 260—37)

This invention relates to vulcanizable vinyl-containing organopolysiloxanes having carbon black and sulfur incorporated therein, to the process of vulcanizing these vulcanizable materials, and to the resulting vulcanizates. More particularly, this invention is concerned with the vulcanizate from 60 to 94.5 parts by weight organopolysiloxane having the average structural formula (1) 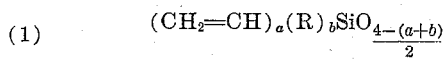

where $a$ has a value of from 0.0086 to 0.18, $b$ has a value from 1.80 to 2.0014 and the sum of $a+b$ is equal to from 1.98 to 2.01, said organopolysiloxane containing from 5 to 40 parts by weight of carbon black and 0.5 to 5 parts by weight of finely divided sulfur. In the above formula R represents organic radicals, at least 50 mole percent of which are methyl with the remainder of the radicals being selected from the class consisting of alkyl radicals, e. g., methyl, ethyl, propyl, butyl, octyl, decyl, octadecyl, etc. radicals; cycloalkyl radicals, e. g., cyclohexyl, cycloheptyl, etc. radicals; aryl radials, e. g., phenyl, diphenyl, naphthyl, etc. radicals; alkaryl radicals, e. g., tolyl, xylyl, ethylphenyl, etc. radicals; aralkyl radicals, e. g., benzyl, phenylethyl, etc. radicals; and halogenated aryl radicals, e. g., chlorophenyl, dibromophenyl, etc. radicals.

In the past, attempts have been made to form carbon black filled organopolysiloxane elastomers by various methods. However, in general, only inferior products have been obtained since the general method of cross-linking organopolysiloxane gums has been with typical free radical polymerization agents such as the acyl peroxides, e. g., benzoyl peroxide, or with azo compounds such as α,α'-azodiisobutyronitrile. In general, these free radical cross-linking agents have been found to be relatively ineffective in polymerizing organopolysiloxane systems containing carbon black, presumably because of some reaction which occurs between the cross-linking agent and the carbon black.

We have now discovered that by forming a highly viscous organopolysiloxane fluid or gum within the scope of Formula 1 which contain silicon bonded vinyl radicals, we are able to incorporate carbon black and sulfur curing agents such as elemental sulfur, sulfur halides, organic sulfides, etc., into the vinyl-containing organopolysiloxane and vulcanize the resulting mixture by heat. The resulting vulcanizates are characterized by their flexibility at temperatures below −50° C., by their outstanding thermal stability at temperatures as high as 150° C., by their high tensile strength and elongation, and by their conducting properties. The vulcanizates are also characterized by their low cost because of use of the relatively inexpensive carbon black filler instead of the more expensive silica aerogel which is usually used in organopolysiloxane elastomers.

The vinyl-containing organopolysiloxane fluids and gums of Formula 1 which may be compounded with carbon black and sulfur and subsequently vulcanized, may be described as organopolysiloxanes containing an average of from 1.98 to 2.01 organic radicals bonded to silicon through silicon carbon linkages with the remainder of the valences of the silicon atoms being satisfied by silicon-oxygen linkages. Of these silicon bonded organic radicals, from 0.0086 to 0.18 silicon bonded vinyl radicals are present per silicon atom. The fluids and gums within the scope of Formula 1 may be formed in the well known manner by the rearrangement and condensation (polymerization) of lower molecular weight organopolysiloxanes in the presence of a suitable organopolysiloxane polymerization catalyst. The relatively low molecular weight starting materials used for the rearrangement and condensation may comprise any mixture of low molecular weight organopolysiloxanes in which the silicon bonded organic radicals are present in a ratio suitable to give the desired general structure of Formula 1 upon rearrangement and condensation.

The viscous fluids and gums within the scope of Formula 1 may be prepared by copolymerizing a low molecular weight organopolysiloxane containing silicon bonded vinyl radicals with one or more low molecular weight organopolysiloxanes containing only saturated hydrocarbon radicals attached to silicon. The low molecular weight organopolysiloxanes containing silicon bonded vinyl radicals and the method of forming compositions within the scope of Formula 1 are well known. See, for example, Roedel Patent 2,420,911, issued May 20, 1947; Marsden Patent 2,445,794, issued July 27, 1948; and Hurd Patent 2,645,628, issued July 14, 1953. The relatively low molecular weight organopolysiloxane containing a silicon bonded vinyl radical may be prepared, for example, by hydrolyzing a silane containing at least one silicon bonded vinyl radical and at least one silicon bonded hydrolyzable group. Thus, methylvinylsiloxanes may be prepared by hydrolyzing methylvinyldichlorosilane or methylvinyldiethoxysilane with water or aqueous HCl. This hydrolysis results in an aqueous phase and an organopolysiloxane phase containing both linear and cyclic methylvinylsiloxanes of varying chain lengths. After hydrolysis, the organopolysiloxane phase may be distilled to isolate compounds such as 1,3,5-trimethyl - 1,3,5 - trivinylcyclotrisiloxane, 1,3,5,7 - tetramethyl - 1,3,5,7 - tetravinylcyclotetrasiloxane, 1,3,5,7,9-pentamethyl - 1,3,5,7,9 - pentavinylcyclopentasiloxane, 1,3,5,7,9,11 - hexamethyl - 1,3,5,7,9,11 - hexavinylcyclotetrasiloxane, as well as higher cyclic methylvinylsiloxanes and a number of linear methylvinylsiloxanes. Other organopolysiloxanes containing silicon bonded vinyl radicals may be prepared by hydrolyzing silanes such as divinyldichlorosilane, divinyldiethoxysilane, vinyltriethoxysilane, trivinylchlorosilane, etc., and separating the organopolysiloxane phase from the aqueous phase.

The low molecular weight organopolysiloxane containing only saturated hydrocarbon radicals bonded to silicon with which the vinyl-containing organopolysiloxane is copolymerized, may be one or more cyclic organopolysiloxanes having the formula (2) 

where $n$ is an integer from 3 to 10 or more and R' represents members selected from the class consisting of alkyl radicals, e. g., methyl, ethyl, propyl, butyl, octyl, decyl, etc. radicals; cycloalkyl radicals, e. g., cyclohexyl, cycloheptyl, etc. radicals; aryl radicals, e. g., phenyl, diphenyl, naphthyl, etc. radicals; alkaryl radicals, e. g., tolyl, xylyl, etc. radicals; aralkyl radicals, e. g., benzyl, phenylethyl, etc. radicals; haloaryl radicals, e. g., chlorophenyl, dibromophenyl, etc. radicals; and mixtures of the aforesaid radicals. Typical compounds within the scope of Formula 3 include, for example, octamethylcyclotetrasiloxane, tetramethyltetraethylcyclotetrasiloxane, octaphenylcyclotetrasiloxane, etc. In addition to supplying the saturated organopolysiloxane to the copolymer by means of the cyclic compounds within the scope of Formula 2 the saturated organopolysiloxane may be also added in the form of the hydrolyzate of difunctional silanes such as the hydrolyzate of dimethyldichlorosilane, diethyldichlorosilane, methylethyldiacetoxysilane, etc. Where it is desired to produce a gum within the scope of Formula 1 where the sum of $a+b$ is less than or greater than 2.00, trifunctional or monofunctional siloxane units may be added in sufficient amount to produce the desired functionality in the polymerized product. The trifunctional siloxane units may be added as monoalkyl siloxane units in the usual fashion as the partial hydrolyzate of trifunctional alkyl silanes such as methyltrichlorosilane, methyltriacetoxysilane, ethyltrichlorosilane, etc. These partial hydrolyzates of the trifunctional compounds may be prepared by hydrolyzing the trifunctional compounds with hydrochloric acid or the like and separating the silicone layer from the aqueous phase. The monofunctional siloxane units may be added as trialkyl siloxane units and are most conveniently employed as part of a trialkylsilyl chain-stopped alkyl polysiloxane such as hexamethyldisiloxane, octadecamethyloctasiloxane or other linear or branch-chain trialkylsilyl chain-stopped organopolysiloxane such as are described in Patnode Patents 2,469,888 and 2,469,890. In selecting the particular saturated organopolysiloxanes to be copolymerized with the vinyl-containing organopolysiloxane, care must be taken to insure that enough silicon bonded methyl radicals are present so that at least 50 mole percent of the R radicals of Formula 1 are methyl.

A typical mixture of an organopolysiloxane containing silicon bonded vinyl radicals and an organopolysiloxane containing only saturated organic radicals which may be used to form compositions within the scope of Formula 1 is a mixture of 1,3,5,7-tetramethyl-1,3,5,7-tetravinylcyclotetrasiloxane with octamethylcyclotetrasiloxane. After mixing these two compounds they may be rearranged and condensed (polymerized) to a gum by effecting reaction with a suitable organopolysiloxane polymerization catalyst.

The low molecular weight organopolysiloxane containing silicon bonded vinyl radicals and the organopolysiloxane containing only saturated organopolysiloxane radicals may be copolymerized with known organopolysiloxane polymerization catalysts. Thus, vinyl-containing organopolysiloxane mixtures may be polymerized to gums readily using from about 0.001 to 0.5 percent, by weight, of cesium hydroxide or rubidium hydroxide at elevated temperatures of the order of from about 110 to 150° C. in times ranging from about 10 to 30 minutes. These same mixtures may be also polymerized to gums with the transient organopolysiloxane polymerization catalysts in a matter of minutes at temperatures of from about 110 to 130° C. These transient organopolysiloxane polymerization catalysts include the quaternary phosphonium hydroxides and quaternary phosphonium alkoxides disclosed in the application of Simon W. Kantor and Alfred R. Gilbert, Serial No. 429,131, filed May 11, 1954, and assigned to the same assignee as the present invention. Typical quaternary phosphonium hydroxide transient catalysts include tetra-n-butyl phosphonium hydroxide, butyltricyclohexyl phosphonium hydroxide, tetra-n-butyl phosphonium butoxide, etc. These transient organopolysiloxane polymerization catalysts also include the solid quaternary ammonium hydroxides disclosed in the application of Simon W. Kantor, Serial No. 429,132, filed May 11, 1954, and assigned to the same assignee as the present invention. These quaternary ammonium hydroxide catalysts are tetramethyl ammonium hydroxide and benzyltrimethyl ammonium hydroxide. In general, polymerization of the low molecular weight vinyl-containing organopolysiloxane mixture within the scope of Formula 1 is effected by heating to a temperature of about 110 to 150° C. and then adding the desired organopolysiloxane polymerization catalyst. However, if desired, the catalyst may be added prior to heating of the mixture to cause polymerization to a gum to be effected when the mixture is later heated to temperatures of the order of 110 to 150° C. The high molecular weight vinyl-containing organopolysiloxane gum prepared by polymerizing an organopolysiloxane mixture having the average composition within Formula 1 is referred to hereinafter for the sake of brevity as "vinyl-containing gum."

A vulcanizable product may be prepared from the vinyl-containing gum described above in the same manner as vulcanizable materials are formed from natural and synthetic hydrocarbon rubber gums. Thus, the vinyl-containing gum may be mixed with carbon black and finely divided sulfur as well as with accelerators, if desired, on differential rubber milling rolls. In general, we prefer to form a compounded product containing from about 60 to 94.5 parts by weight of vinyl-containing gum, from 5 to 40 parts, by weight, of carbon black, and from 0.5 to 5 parts, by weight, of sulfur. When incorporating a vulcanization accelerator into the product it is desirable to employ from about 0.1 to 2.0 parts, by weight, of accelerator. Any of the typical vulcanization accelerators may be employed effectively to speed up the rate of vulcanization of the products. Among the accelerators are included, for example, mercaptobenzothiazole, diphenylguanidine, triphenylguanidine, tetramethylthiuramdisulfide, zincdimethyldithiocarbamate, thiocarbanilide, hexamethylenetetramine, benzothiazodisulfide, etc.

The milling operation may be carried out by adding the vinyl-containing gum to the rubber milling rolls and then adding the other ingredients which go into the compounded rubber. After the ingredients of the rubber are thoroughly mixed, which may be after a few minutes or few hours of milling depending on the rate of milling and the amount of material being milled, the milled product is removed from the rolls. This milled material may then be stored until it is desired to prepare the finished product or may be immediately calendered on heated rolls to form sheet material, extruded into various elongated shapes, or molded in heated presses to form a vulcanized product of the desired shape. Where presses are employed for curing the compounded gum, temperatures of from about 100 to 175° C. are employed for cure times which vary from about 5 minutes to an hour depending on the cure temperature used.

The following examples are illustrative of the practice of our invention and are not intended for purposes of limitation.

EXAMPLE 1

This example describes the preparation of low molecular weight organopolysiloxanes containing silicon bonded vinyl radicals. A mixture of 1000 grams (6.2 moles) of redistilled methylvinyldiethoxysilane (boiling point 133° C. at 1.0 atmosphere, refractive index $n_D^{20}$ 1.4001, density $d_4^{20}$ 0.8620) and 1000 ml. of 6 normal hydrochloric acid was refluxed for 72 hours. The resulting lower organopolysiloxane phase was washed four times with distilled water, then dried over anhydrous potassium carbonate and filtered. This resulted in a mixed methylvinylsiloxane oil containing both cyclic and linear methylvinylpolysiloxanes of varying chain lengths. This oil was distilled rapidly after the addition of 1 percent, by weight, of p-tert-butyl catechol as a polymerization inhibitor. The distillation was carried out at 0.5 mm. using a 12" Vigreux column. The fraction boiling between 60 and 135° C. at 0.5 mm. was collected and after the addition of another one percent, by weight, of p-tert-butyl catechol the distillate was fractionated under reduced pressure in a ½" by 16" protruded-packed column. This fractionation yielded (1) a fraction boiling at 111 to 112° C. at 10 mm., (2) a fraction boiling at 115 to 143° C. at 11 mm., and (3) a fraction boiling at 143 to 172.5° C. at 11 mm.

Fraction 1 corresponded to 1,3,5,7-tetramethyl-1,3,5,7- tetravinylcyclotetrasiloxane. Analysis of this compound showed it to contain 41.9 percent carbon, 7.2 percent H, 32.5 percent Si; to have a molecular weight of 346 by cryoscopic determination using a solution of 0.240 gram of the siloxane in 19.17 grams of cyclohexane, and a molar refractivity, $MR_D$ 90.93. Theoretical values are 41.8 percent carbon, 7.02 percent hydrogen, 32.6 percent silicon, molecular weight 344.7, $MR_D$ 91.20. Distillation of this compound in a small Vigreux column at atmospheric pressure without polymerization or decomposition showed its boiling point to be 224 to 224.5° C. at 758 mm.

Fraction 2 was washed with 25 ml. portions of 1 percent sodium carbonate until the p-tert-butyl catechol was removed (as evidenced by a negative ferric chloride test on the aqueous solution). The oil was dried over anhydrous potassium carbonate and distilled under reduced pressure in a ½" x 16" protruded-packed column. Distillation yielded 1,3,5,7,9-pentamethyl-1,3,5,7,9-pentavinylcyclopentasiloxane at 145 to 146° C. at 13 mm. This compound was analyzed and found to contain 41.6 percent C, 7.2 percent H, and 32.8 percent Si, with a molecular weight of 437 and $MR_D$ 113.58. This compares to the theoretical values of 41.8 percent C, 7.02 percent H, 32.6 percent Si, with a molecular weight of 430.8 and $MR_D$ 114.00. This siloxane could be distilled without polymerization or decomposition at 260 to 262° C. under 750 mm.

Fraction 3 was redistilled under reduced pressure in a ½" x 16" protruded-packed column to give pure 1,3,5,7,9,11-hexamethyl-1,3,5,7,9,11-hexavinylcyclohexasiloxane which boiled between 160.5 and 161° C. at 5 mm. Analysis of this compound showed it to contain 41.3 percent C, 7.1 percent H, 31.3 percent Si, with a molecular weight of 536 and $MR_D$ 135.58. This compares with the theoretical values of 41.8 percent C, 7.02 percent H, and 32.6 percent Si, with a molecular weight of 517.0 and $MR_D$ 136.80. This compound was distilled at atmospheric pressure and found to have a boiling point of 296 to 297° C. at 750 mm. The boiling points, melting points, indices of refraction and densities of the three compounds isolated above are listed in Table I.

*Table I*

| Siloxane | B.P.,°C. | mm. | M.P.,°C. | $n_D^{20}$ | $d_4^{20}$ |
|---|---|---|---|---|---|
| $[(CH_3)(CH_2=CH)SiO]_4$ | 111–12<br>224–224.5 | 10<br>758 | −43.5±0.1 | 1.4342 | 0.9875 |
| $[(CH_3)(CH_2=CH)SiO]_5$ | 145–146<br>261–262 | 13<br>758 | −140 to −136 | 1.4373 | 0.9943 |
| $[(CH_3)(CH_2=CH)SiO]_6$ | 160.5–161<br>172–172.5<br>296–297 | 5<br>11<br>758 | −123 to −119 | 1.4400 | 1.0050 |

EXAMPLE 2

A vinyl-containing organopolysiloxane gum was prepared by adding 3 parts, by weight, of 1,3,5,7,9-pentamethyl-1,3,5,7,9-pentavinylcyclopentasiloxane to 97 parts, by weight, of octamethylcyclotetrasiloxane and heating the mixture to 135° C. At this point 0.05 percent, by weight, of cesium hydroxide was added and the mixture polymerized to a gum within about 15 minutes. This vinyl-containing gum had the average structural formula $(CH_2=CH)_{0.026}(CH_3)_{1.974}SiO$. In a similar fashion, gums containing 2.0 to 4.0 percent, by weight, of 1,3,5,7,9-pentamethyl-1,3,5,7,9-pentavinylcyclopentasiloxane in octamethylcyclotetrasiloxane were prepared using amounts of cesium hydroxide as a polymerization catalyst which varied from about 0.001 to 0.5 percent and using polymerization temperatures from about 130 to 150° C. This resulted in vinyl-containing gums of the average structural formulas $(CH_2=CH)_{0.017}(CH_3)_{1.983}SiO$ and $(CH_2=CH)_{.035}(CH_3)_{1.965}SiO$, respectively.

EXAMPLE 3

A gum containing diphenyl siloxane units may be prepared by the method of Example 2, for example, by adding 3 parts, by weight, of 1,3,5,7-tetramethyl-1,3,5,7-tetravinylcyclotetrasiloxane, 47 parts, by weight, of octamethylcyclotetrasiloxane, and 50 parts, by weight, of octaphenylcyclotetrasiloxane to a temperature of about 150° C. and adding about 0.05 percent, by weight, of cesium hydroxide based on the total weight of the organopolysiloxanes present. In a matter of 10 to 20 minutes a stiff gum will be formed.

EXAMPLE 4

A carbon-filled, sulfur vulcanized organopolysiloxane rubber was prepared by milling together 50 grams of the 3 weight percent vinyl-containing organopolysiloxane gum of Example 2, 25 grams of carbon black (Kosmos 60), 1.5 grams of sulfur, 0.63 gram of benzothiazodisulfide (Altax), and 0.13 gram of diphenyl guanidine. These ingredients were milled on differential rubber milling rolls for about 30 minutes until a uniform product was obtained. This product was press cured for 30 minutes at 150° C. to yield a rubber which had a tensile strength of 800 p. s. i. and an elongation at break of 600 percent. This rubber exhibited extremely high tear resistance, as indicated by the fact that a notched sample was extremely difficult to tear and upon stretching the rubber, it was observed that it got warm just as natural rubber does in stretching. This rubber was flexible at −70° C.

EXAMPLE 5

Another carbon-filled, sulfur vulcanized organopolysiloxane rubber may be prepared by adding 10 parts, by weight, of 1,3,5,7-pentamethyl-1,3,5,7-pentavinylcyclopentasiloxane to 90 parts, by weight, of octamethylcyclotetrasiloxane and heating the mixture to about 150° C. At this time 0.05 percent, by weight, of cesium hydroxide are added and after 15 minutes a high molecular weight gum is obtained. This gum will have the average structural formula $(CH_2=CH)_{0.087}(CH_3)_{1.913}SiO$. One hundred grams of this gum may be mixed with 30 grams of carbon black (Kosmos 60), 2 grams of mercaptobenzothiazole, 1 gram of diphenyl guanidine, and 4 grams of sulfur. The mixture is then milled on differential rubber milling rolls for about 30 minutes until an intimate mixture is obtained. The milled product may then be press cured at 150° C. for 60 minutes to yield an organopolysiloxane rubber which has a high tensile strength and which is flexible at temperatures as low as −70° C.

EXAMPLE 6

A vinyl-containing gum was prepared by mixing 3 grams of 1,3,5,7-tetramethyl-1,3,5,7-tetravinylcyclotetrasiloxane prepared by the method of Example 1 with 97 grams of octamethylcyclotetrasiloxane and about .02 gram of tetrabutylphosphonium hydroxide. This mixture was heated to a temperature of about 110° C. and after about 15 minutes a high molecular weight gum was obtained. Fifty grams of this gum were mixed with 25 grams of carbon black (Kosmos 60), 0.8 gram of benzothiazodisulfide and 1.5 grams of sulfur. The mixture was milled on differential rubber milling rolls for about 20 minutes until an intimate mixture was obtained. This milled product was then press cured at 150° C. for 45 minutes to yield an organopolysiloxane rubber having a tensile strength of 960 p. s. i. and an elongation at rupture of about 400 percent.

Although the vinyl-containing organopolysiloxane gums of the present invention have been described in the preceeding examples only in terms of gums having a ratio of organic radicals to silicon atoms of 2.0, it should be understood that gums having a ratio of organic radicals to silicon atoms of from 1.98 to 2.01 may be prepared by the method of Example 2 by adding monofunctional or trifunctional siloxane units to the low molecular weight mixture before polymerization. With regard to the phenyl-containing siloxane units in the present invention, it should be understood that the phenyl radicals may contain nuclear substituents such as, for example, alkyl radicals, e. g., methyl, ethyl, propyl, butyl, octyl, etc., aryl radicals, e. g., phenyl, tolyl, naphthyl, etc., as well as halogen substituents such as, for example, fluorine, chlorine, bromine, etc.

Although the sulfur vulcanized rubbers of the present invention have been described as containing only sulfur and accelerating agents, it should be understood that these rubbers may be compounded in the same manner as hydrocarbon rubbers with various additives such as accelerator activators, antioxidants, softeners, inhibitors, etc. In addition to sulfur, other sulfur containing vulcanizing agents may be employed.

The vulcanizable organopolysiloxane, carbon black, and sulfur mixtures of the present invention are valuable as intermediates in the preparation of sulfur cured organopolysiloxane rubbers. The sulfur cured organopolysiloxane rubbers have utility as gaskets and the like in applications where resilience and thermal stability are necessary at extremes of temperature. The carbon-filled, sulfur cured organopolysiloxane rubbers are particularly valuable because of the conducting property imparted to the rubber by the carbon filler. These carbon-filled rubbers are useful in applications where both flexibility and conductivity are required. A typical application is in the manufacture of flexible heating elements where the same member is required to be both flexible and conducting.

What we claim as new and desire to secure by Letters Patent of the United States is:

1. A vulcanizable mixture comprising (A) from 60 to 94.5 parts, by weight, of an organopolysiloxane gum having the average structural formula $$(CH_2=CH)_a(R)_bSiO_{\frac{4-(a+b)}{2}}$$

where R represents members selected from the class consisting of alkyl, cycloalkyl, aryl, alkaryl, aralkyl, and halogenated aryl radicals and mixtures thereof, at least 50 mole percent of said members being methyl radicals, $a$ has a value from 0.0086 to 0.18, $b$ has a value from 1.80 to 2.0014, the sum of $a+b$ being equal to from 1.98 to 2.01, (B) from 5 to 40 parts, by weight, of carbon black, and (C) from 0.5 to 5 parts, by weight, of sulfur.

2. A product comprising the vulcanized mixture of claim 1.

3. A vulcanizable mixture comprising (A) from 60 to 94.5 parts, by weight, of an organopolysiloxane gum having the average structural formula $$(CH_2=CH)_a(CH_3)_bSiO_{\frac{(4-a+b)}{2}}$$

where $a$ has a value from 0.0086 to 0.18, $b$ has a value from 1.80 to 2.0014, the sum of $a+b$ being equal to from 1.98 to 2.01, (B) from 5 to 40 parts, by weight, of carbon black, and (C) from 0.5 to 5 parts, by weight, of sulfur.

4. A product comprising the vulcanized mixture of claim 3.

5. A vulcanizable mixture comprising (A) from 60 to 94.5 parts, by weight, of an organopolysiloxane gum having the average structural formula $$(CH_2=CH)_a(R)_bSiO_{\frac{4-(a+b)}{2}}$$

where R represents members selected from the class consisting of alkyl, cycloalkyl, aryl, alkaryl, aralkyl, and halogenated aryl radicals and mixtures thereof, at least 50 mole percent of said members being methyl radicals, $a$ has a value from 0.0086 to 0.18, $b$ has a value from 1.80 to 2.0014, the sum of $a+b$ being equal to from 1.98 to 2.01, (B) from 5 to 40 parts, by weight, of carbon black, and (C) from 0.5 to 5 parts, by weight, of sulfur, and from 0.1 to 2.0 parts, by weight, of a rubber vulcanization accelerator.

6. The process of preparing a carbon filled organopolysiloxane rubber which comprises mixing (A) from 60 to 94.5 parts, by weight, of an organopolysiloxane gum having the average structural formula $$(CH_2=CH)_a(R)_bSiO_{\frac{4-(a+b)}{2}}$$

where R represents members selected from the class consisting of alkyl, cycloalkyl, aryl, alkaryl, aralkyl, and haloaryl radicals and mixtures thereof, at least 50 mole percent of said members being methyl radicals, $a$ has a value from 0.0086 to 0.18, $b$ has a value of 1.80 to 2.0014, the sum of $a+b$ being equal to from 1.98 to 2.01, (B) 5 to 40 parts, by weight, of carbon black, and (C) from 0.5 to 5 parts, by weight, of sulfur, and heating the resulting mixture at elevated temperatures until vulcanization has been effected.

References Cited in the file of this patent

UNITED STATES PATENTS

| | | |
|---|---|---|
| 2,557,928 | Atkinson | June 26, 1951 |
| 2,610,167 | Te Grotenhuis | Sept. 9, 1952 |
| 2,692,844 | Hyde | Oct. 26, 1954 |
| 2,713,564 | Pfeifer et al. | July 19, 1955 |

OTHER REFERENCES

Hurd et al.: "Vinyl and Allyl Silicone Polymers and Copolymers," Ind. and Eng. Chem., vol. 40, November 1948, pages 2078–2081.

Hurd et al.: Ind. & Eng. Chem., vol. 40, No. 11, November 1948, pages 2078–2081.